UNITED STATES PATENT OFFICE.

GIUSEPPE GIANOLI, OF MILAN, ITALY, ASSIGNOR TO THE FIRM OF LEPETIT, DOLLFUS AND GANSSER, OF MILAN, ITALY.

PROCESS OF PRODUCING TANNING EXTRACTS.

1,063,428. Specification of Letters Patent. Patented June 3, 1913.

No Drawing. Application filed June 30, 1908. Serial No. 441,205.

*To all whom it may concern:*

Be it known that I, GIUSEPPE GIANOLI, a subject of the King of Italy, and a resident of Milan, Italy, have invented new and useful Improvements in Processes of Producing Tanning Extracts; and in order that others skilled in the art may understand and practise my invention I give the following description and specification thereof.

My invention relates to tanning extracts and processes of producing the same and has particular reference to quebracho and similar extracts of the character referred to in the U. S. Patent, No. 799,246, granted to Lepetit and Tagliani, September 12, 1905, such extracts in the crude condition having the tanning principle in a difficultly soluble resinous condition.

The object of the invention is to render quebracho and similar extracts soluble, even in cold water, to convert the objectionable insoluble resinous substance into such condition that it remains soluble in the presence of the soluble part of the extract and thus to make the extract more suitable, efficient and valuable for tanning purposes. Tanning materials of the character mentioned, particularly quebracho, while known to possess a large proportion of valuable tanning principles, have not been favorably received in the art by reason of the said insoluble resinous substances associated therewith; and so far as I am aware the process for treating them disclosed in U. S. Patent 799,246 is the only one which has met with practical success. In experimenting with such extracts, I have discovered that lignosulfonates of soda containing combined sulfur have the property, when suitably treated, of converting the resinous insoluble quebracho extract into a readily soluble condition. For the purposes of this invention, the lignosulfonate of soda may be obtained from waste sulfite liquors resulting from cellulose extraction of pulp-making processes for paper, etc., by subjecting such liquors to suitable treatment to eliminate the lime and the sulfites present therein. It may be stated that the active constituent of these waste sulfite liquors is known as lignoresin or lignosulfonate, and being of the nature of an acid substance, is capable of forming salts with alkalis—soda, lime or the like. The product of the treatment results in the production of the lignosulfonate of soda, where soda is the alkali employed, as above mentioned. This substance may also be termed a sodium salt of lignoresin. To free such liquors from lime and sulfites, I add lime water to the liquor in sufficient quantity to neutralize the acid so that the bi-sulfite of lime is converted into the insoluble neutral sulfite, which precipitates and which is then removed in any convenient manner, as by filtration. The small excess of lime is then removed by precipitation by adding a suitable proportion of soda, or of the cheaper sulfate of soda, which causes the lime to be precipitated. The precipitated calcium compound may then be removed in any convenient manner, as by filtration. The liquor thus treated is neutral and free from lime and sulfurous acid; it contains principally lignosulfonate of soda and gives off no sulfurous acid, or at most only traces of it, upon addition of mineral acids. The sulfite liquor, treated as above described to free the same from acid and lime, is mixed with crude resinous quebracho extract and this mixture, (the solubility of which is only very slightly increased as compared with the crude quebracho extract), is heated to a temperature of from 95 degrees to 115 degrees C. for a certain period. I have found that the proportions of from 20% to 60% of the lignosulfonate of sodium solution after having been freed from lime and sulfurous acid added to the crude quebracho extract gives satisfactory results; but obviously the proportions will be varied and determined according to the circumstances and the character of the extract and sulfite liquor employed. The result of this treatment produces an extract which is readily soluble in water—a very interesting result which was not at all to be expected.

As an illustrative example of the carrying out of the invention I give the following: Two thousand pounds of crude quebracho extract of 28 degrees Bé. density is charged into a suitable vessel, capable of being heated by steam or otherwise, and provided, preferably, with a mechanical stirring apparatus. This extract is heated to a temperature of from 60 to 70 degrees C. in order to make it more fluid. To this is then added about 500 pounds of the above mentioned lignosulfonate of soda solution of about 25 degrees Bé., stirring and heating the mass for a period of from four to five hours at a temperature of from 95 to 100 degrees C., until a test shows a sufficient degree of solubility of the extract in cold water, as compared with the crude extract. Instead of heating in an open vessel for a period of from four to five hours the mixture may, if desired, be heated in a closed vessel, permitting the temperature to be raised to 115 degrees C., or even higher. By proceeding in this manner, a comparatively short time is required for the process, the same degree of solubility being obtained in half the time, or less. The extract so obtained differs from that obtained according to U. S. Patent 799,246, in that it does not contain bi-sulfite or sulfite, although it does contain a certain amount of combined sulfur from the lignosulfonate; and the addition of bi-sulfite or acid to the herein described extract or product does not alter the solubility. The product so obtained, consisting of quebracho treated with the sodium-lignosulfonate as described, has very valuable and efficient tanning properties and produces a nice light-colored leather, particularly when treated with sulfurous acid to bleach the same to a certain extent. Such subsequent treatment with sulfurous acid is merely additional and for the purpose of making the extract more suitable or improving its condition for tanning surfaces.

I am aware that waste residual liquors from the manufacture of sulfite pulp have been suggested for use in tanning, but these have not been used for the purpose and in the manner herein set forth. Patents have been granted in Germany. and elsewhere to Mitcherlich, for the use of such liquors for tanning purposes, but so far as I am aware such patented processes have not proved wholly satisfactory or advantageous in practice, for the reason that even after treatment of the liquors to eliminate lime salts, etc., such liquors have not sufficient tanning properties to be of practical commercial use.

I am also aware of the German patents, Nos. 152,236 and 195,643, granted to Max Hönig and W. H. Philippi. Such processes are not wholly advantageous or satisfactory from the presence of the lime salts remaining in the liquor, which is very objectionable to the extraction of tanning materials, as also in tanning process itself. In the Philippi process the lime salts, chiefly sulfite of lime of the liquors, are precipitated by means of soda, and the treated liquor, therefore, still contains a considerable amount of sulfurous acid in the form of sodium sulfite. According to the process of my invention, I eliminate both the sulfurous acid and the lime.

What I claim is:—

1. The process of producing a soluble quebracho tanning extract which consists of treating crude resinous quebracho extract with lignosulfonate of soda solution at a temperature of from 95 degrees to 115 degrees C.

2. The process of producing soluble quebracho tanning extracts which consists in treating crude quebracho extract with waste liquor from sulfite pulp making, said liquor being freed from sulfurous acid and lime compounds, and conducting such treatment at a temperature of from 95° to 115° C.

3. The process of producing a soluble quebracho tanning extract which consists in treating waste liquor from sulfite pulp making with lime water to free said liquor from sulfurous acid, then treating said liquor with sulfate of soda to free the same from lime compounds, and heating the liquor so treated with crude resinous quebracho extract to a temperature of from 95 degrees to 115 degrees C.

GIUSEPPE GIANOLI.

Witnesses:
    MICHAEL SIERSLAKA, JR.,
    ROBERTO LEPETIT.